United States Patent [19]

Kärnä et al.

[11] Patent Number: 4,989,837
[45] Date of Patent: Feb. 5, 1991

[54] PROCEDURE FOR PRODUCING AN ENVELOPE STRUCTURE FOR A STORAGE BATTERY

[75] Inventors: Toivo Kärnä, Porvoo; Ahti Kemppi, Järvelä; Esko Savolainen, Hollola; Kalevi Lind, Tampere; Niilo Jääskö, Porvoo; Olli Walden, Espoo, all of Finland

[73] Assignee: Neste Oy, Finland

[21] Appl. No.: 364,781

[22] Filed: Jun. 9, 1989

[30] Foreign Application Priority Data

Jun. 9, 1988 [FI] Finland ............................ 882728

[51] Int. Cl.$^5$ ............................................. B29C 39/10
[52] U.S. Cl. .............................. 264/261; 264/272.21; 264/277; 264/279.1
[58] Field of Search ............... 264/259, 261, 271.1, 264/272.11, 272.14, 272.15, 272.21, 277, 279.1

[56] References Cited

U.S. PATENT DOCUMENTS 3,278,679 10/1966 Shannon .................... 264/272.21
3,919,371 11/1975 Jaohe ......................... 264/272.21
4,171,564 10/1979 Action et al. .............. 264/272.21

Primary Examiner—Willard Hoag
Attorney, Agent, or Firm—Steinberg & Raskin

[57] ABSTRACT

The present invention concerns a procedure for producing an envelope structure for a storage battery having a housing, a cover, and partitions separating cells therein. The battery in particular comprises one or several cells enclosed within the housing, with each cell containing electrolyte and monopolar plates and/or bipolar plates separated from one another by separator plates, and being coated with positive and/or negative active mass, in addition to the requisite electrical connectors interconnecting the cells and/or plates. The envelope structure of the storage battery is produced by casting with electrically-insulating an electrolyte-impermeable material, using in the casting the cells of the storage battery at an inner mold, and separately-constructed mold structure as an outer mold. Wall thickness of the housing of the storage battery is defined with the aid of a spacer structure remaining inside the cast.

8 Claims, 4 Drawing Sheets

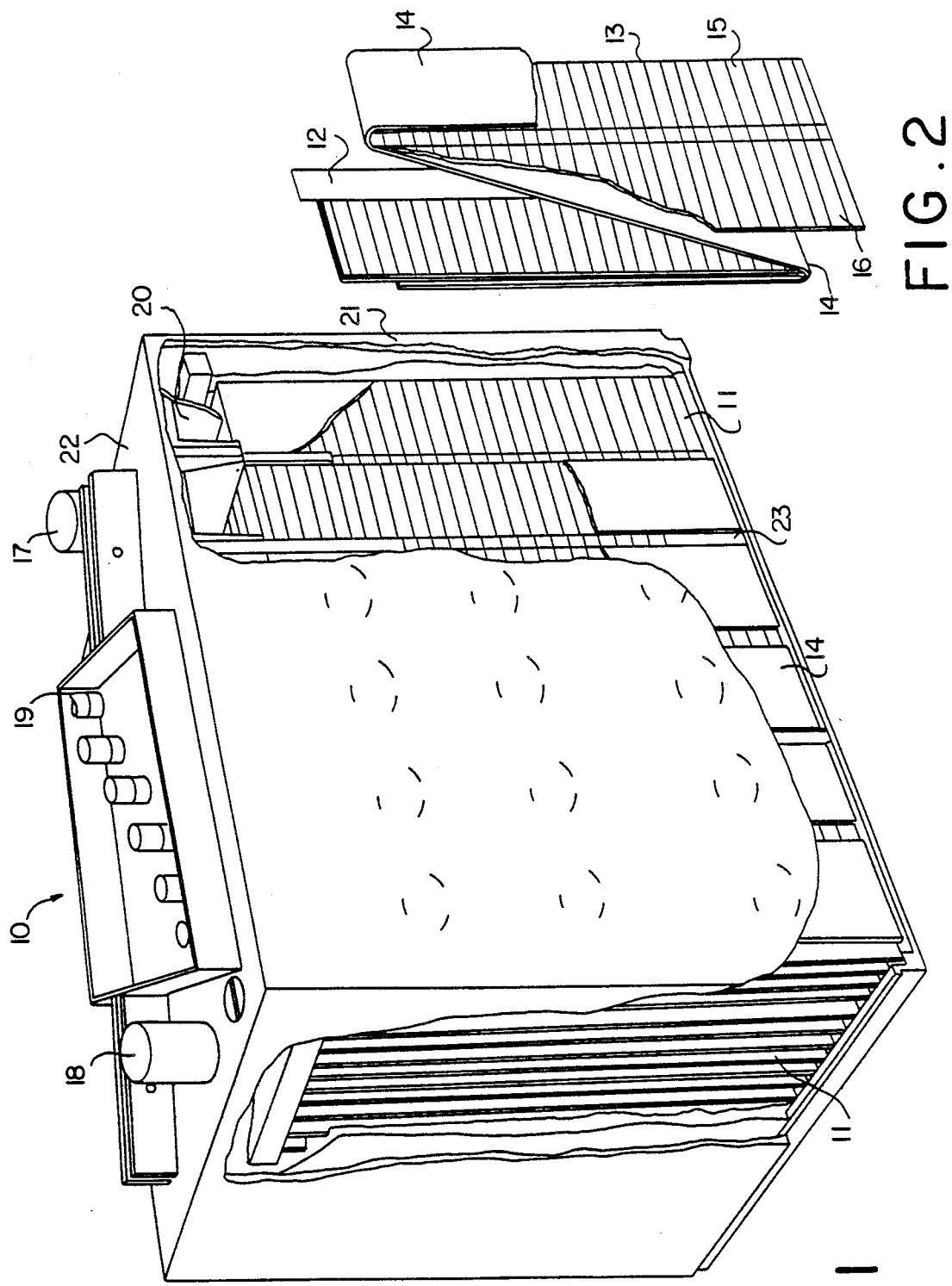

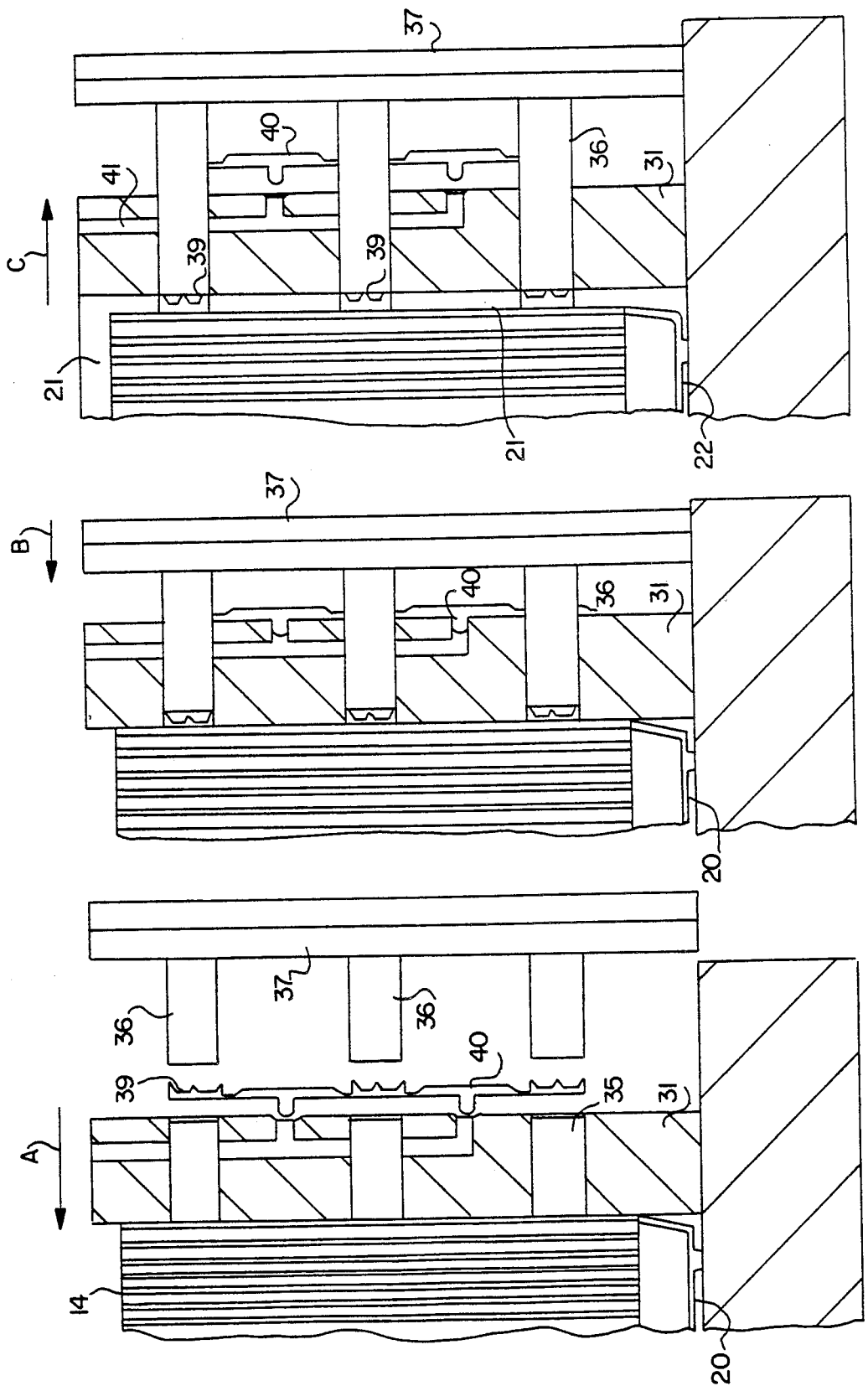

PROCEDURE FOR PRODUCING AN ENVELOPE STRUCTURE FOR A STORAGE BATTERY

BACKGROUND OF THE INVENTION

The present invention concerns a procedure for producing an envelope structure for a storage battery having a housing, a cover, and partitions separating cells from one another. This battery has one or several cells enclosed within the housing, with each cell containing electrolyte and monopolar plates and/or bipolar plates separated from one another by plates and coated with positive and/or negative active mass, along with requisite electrical connectors interconnecting the cells and/or plates.

Storage batteries are conventionally produced so that the cells are stacked in a box provided with partitions, and as a final phase for storage battery production, a cover is fixed on top of the box so that the electrolyte solution will not run from one compartment into another compartment or out therefrom.

In Finnish Patent Application No. 855096, a storage battery of the type described above is disclosed, in which the wall separating or sealing each cell from the adjacent cells and/or from the box, has been produced by filling the spaces around the plate stacks and/or therebetween, with an electrically-insulating and electrolyte-impermeable material. This material has been hardened directly in place, for providing sealed and/or insulating walls.

SUMMARY OF THE INVENTION

Accordingly, it is an object of the present invention to achieve improvement in the production procedure disclosed in Finnish Patent Application No. 855095 for producing partitions for a storage battery separating the housing and the cells.

It is also an object of the present invention to provide a procedure of producing a battery in which the number of various production steps can be reduced, while entirely omitting need for provision of glued joints.

It is a more specific object of the present invention, to obtain a procedure which allows production of an envelope structure for a storage battery having a housing, a cover, and partitions separating the cells, in a single work phase.

It is an additional object of the present invention to achieve a procedure for preparing a storage battery in which the cells of the storage battery need not have to be stacked into a box.

These and other objects are attained by the present invention which is directed to a method for producing an envelope structure for a storage battery having at least one cell therein, comprising the steps of arranging the at least one cell as an inner mold for casting of the envelope structure, arranging a separate, outer mold structure as an outer mold for the casting of the envelope structure, casting electrically-insulating and electrolyte-impermeable material between the inner mold and the outer mold, and determining wall thickness of housing forming part of the envelope structure with a spacer structure situated to remain inside the casting. Preferably, the method comprises the additional step of providing a cover upon the battery as part of the envelope.

In particular, the battery comprises a plurality of cells, with partitions separating the cells from one another being cast between adjacent cells and forming part of the envelope structure. Each cell contains electrolyte and at least one of a monopolar plate and a bipolar plate coated with at least one of positive and negative active mass. These plates are separated from any adjacent monopolar or bipolar plates, by a separator plate. Furthermore, electrical connectors interconnecting the cells or the polar plates, are provided.

Accordingly, the objects of the present invention are attained with a procedure which is principally characterized by the envelope structure for the storage battery being produced by casting with electrically-insulating and electrolyte-impermeable material, by using in casting the cell assembly of the storage battery as an inner mold and a separately-constructed mold structure as an outer mold, and by the wall thickness of the battery housing being defined with the aid of a spacer structure remaining inside the casting.

Several important advantages are attained with the procedure of the present invention. The number of various production steps is reduced in the procedure of the present invention. The leakage risk of the storage battery produced in accordance with the procedure of the present invention also decreases because the joints which are no longer needed will be eliminated, whereby the mechanical strength of the storage battery is also improved. The wall thicknesses of the housing can be accurately dimensioned in the procedure of the present invention. Furthermore, in the procedure of the present invention, the cells need not necessarily be stacked into a box provided with partitions.

BRIEF DESCRIPTION OF THE DRAWINGS

The present invention will be described in greater detail with reference to a number of advantageous embodiments of the invention illustrated in the accompanying figures, to which, however, the present invention is not intended to be exclusively confined. In the drawings, FIG. 1 is a partially sectional, axonometric view of an advantageous embodiment of a storage battery produced in accordance with the procedure of the present invention;

FIG. 2 is an axonometric view of an advantageous embodiment of monopolar and bipolar plates utilized in the storage battery of FIG. 1;

FIG. 5 is a schematic elevational view of a mobile mold structure with the aid of which a spacer structure is pushed against the cell assembly, in accordance with the procedure of the present invention;

FIG. 6 is a schematic elevational view of the mobile mold structure of FIG. 5 in a step in which the spacer structure has been brought against the cell assembly and the mobile mold structure begins moving away from the cell assembly;

FIG. 7 is a schematic elevational view of the mobile mold structure of FIGS. 5 and 6, in a position in which the mold structure has moved away from the cell assembly by a distance equivalent to ultimate wall thickness.

DESCRIPTION OF THE PREFERRED EMBODIMENTS

Figure 3:
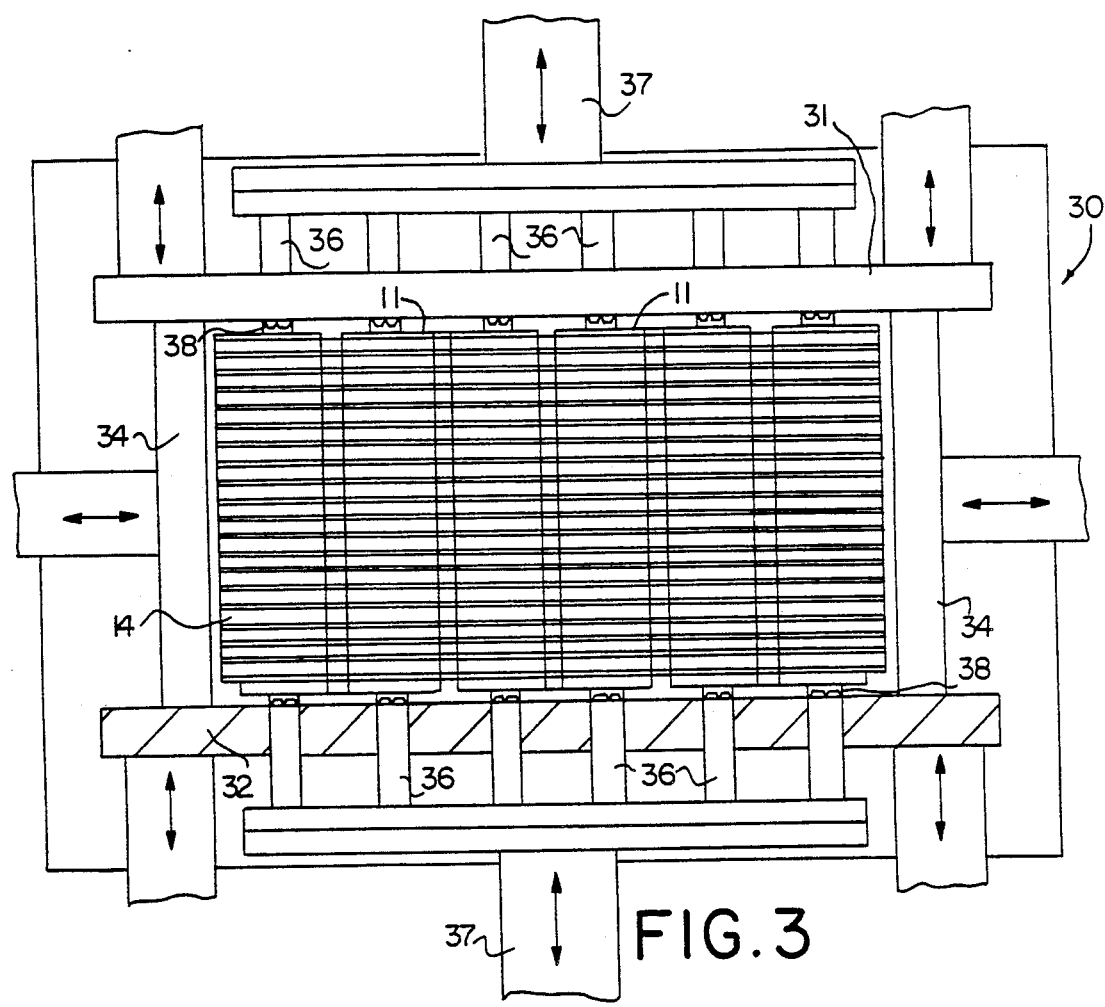
FIG. 3 is a schematic elevational view of an advantageous embodiment of a mold structure utilized in the procedure of the present invention.

In the embodiments illustrated in FIGS. 1-8, the cells of the storage battery 10 are indicated by reference numeral 11. Each cell 11 contains electrolyte and monopolar and/or bipolar plates separated from each other by separator plates 14 and coated by positive and/or negative active mass.

In FIG. 1, the positive terminal of the storage battery 10 is indicated by reference numeral 17, and the negative terminal by reference numeral 18. An overpressure valve is indicated by reference numeral 19, and a gas vault structure is indicated by reference numeral 20. The envelope structure of the storage battery 10 comprises housing 21, a cover 22, and partitions 23 separating the cells 11 from one another.

The monopolar plate is indicated by reference numeral 12 and the bipolar plate is indicated by reference numeral 13 in FIG. 2. The bipolar plate 13 is coated with positive active mass 15 and negative active mass 16, while the monopolar plate 12 is merely coated with either positive active mass 15 or negative active mass 16. In the embodiment of FIG. 2, felt-like separator plate material is used as the separator plate 14, so that electrolyte has been absorbed therein.

The following measures are accomplished in the most common embodiment of the present invention. The terminal connectors are welded upon the monopolar plates 12. The gas vaults 20 are disposed on top of the cells 11 and the mold structure 30 is disposed around the cell assembly. The thickness of the cast is determined with the aid of a spacer structure 38, this spacer structure 38 remaining inside the cast. The spacer structure 38 mediates the pressure of the mold structure 30 and holds the cell assembly together, so that the cell assembly is controlled without binding or gluing. The walls of the mold structure 30 may be mobile or affixed.

The mold structure used in the procedure of the present invention is generally indicated by reference numeral 30 in FIGS. 3-7. In this embodiment, the mold structure 30 comprises walls 31 and 32 in the direction of the sides of the storage battery 10, these walls being mobile. Furthermore, the mold structure 30 includes end walls 33 and 34 which, in this embodiment, are equally mobile. The two other opposite walls of the mold structure 30 are not visible in FIG. 3.

Figure 4:
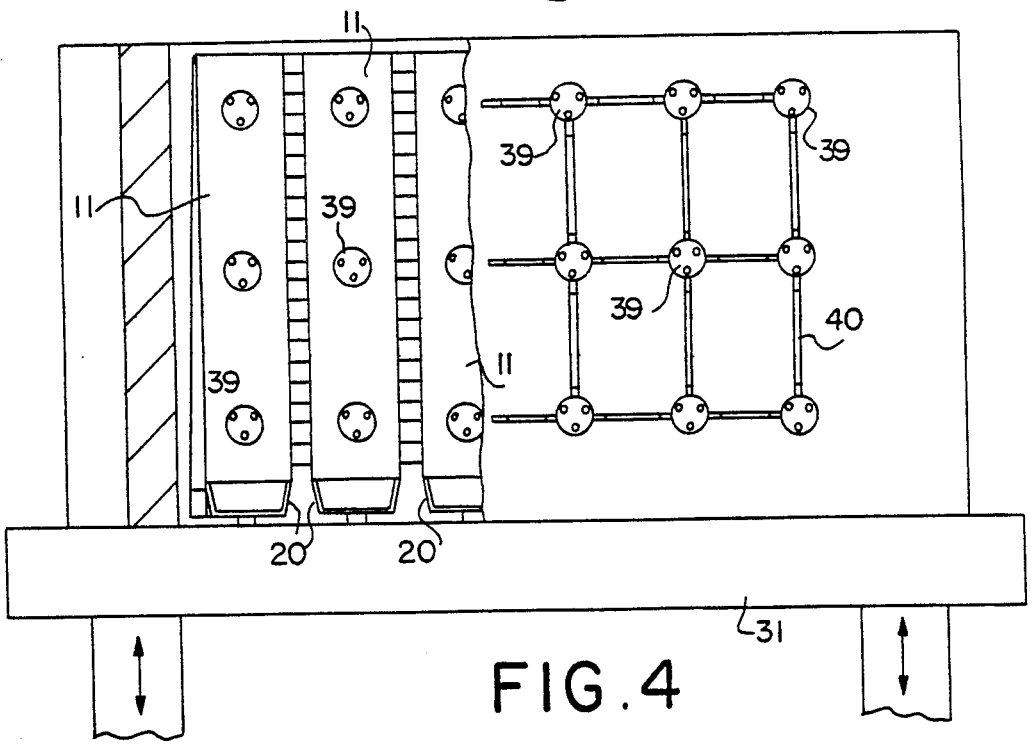
FIG. 4 is a schematic elevational view of a cell assembly provided with a gas vault structure turned upside down against a bottom plate of the mold structure in accordance with the procedure of the present invention.

Pusher means 37 provided with pins 36 are provided on the side walls 31 and 32 of the mold structure 30. In the embodiment as illustrated in FIGS. 3-7, a spacer structure 38 defined by spacing washers 39 is used. The spacing washers 39 and the clips 40 thereof constitute the net-like spacer structure 38 as illustrated in FIG. 4.

The movements of the side wall 31 of the mold structure 30 can best be seen in FIGS. 5-7. In the phase illustrated in FIG. 5, the side wall 31 has moved in the direction depicted by arrow A and is now positioned against the cell 11. The pins 36 of the pusher means 37 have withdrawn from the holes 35 in the side wall 31.

In the phase illustrated in FIG. 6, the pusher means 37 moves in the manner indicated by arrow B, whereby the pins 36 push the spacing washers 39 of the spacer structure 38 against the cell 11, while the clips 40 remain fixed on the outer wall of the side wall 31 of the mold structure 30.

As shown in FIG. 7, the side wall 31 has moved in the direction indicated by arrow C, a distance determined by the spacing washers 39, whereby after the cast, an envelope structure for a storage battery 10 having a housing 21, a cover 22, and partitions 23 separating the cells 11 from one another, is produced. Finally, the clips 40 are blown away with the aid of an out-blowing system including passages 41. As best seen in FIG. 7, the spacing washers 39 remain inside the cast.

As disclosed in an advantageous embodiment of the present invention illustrated in FIGS. 3-7, the above-noted cell assembly is transferred to form the inner mold as follows. The parts 32 and 31 of the outer mold 30 situated in the direction of the sides of the storage battery 10, are urged against the sides of the cell assembly so that the assembly becomes compressed into its final thickness, and at the same time, supported by the parts 32 and 31, the battery system can be transferred away from the stacking jig. Thereafter, the terminals 17 and 18 of the storage battery 10 (FIG. 1) can be fixed to the end pieces of the set of connecting wires, e.g. by soldering. Thereafter, the press rods 36 penetrating through the holes 35 in the side pieces 31 and 32 of the outer mold 30 cut, while pushing in, first the spacing washers 39 provided with teeth off from the clips 40 and, thereafter, push the washers 39 themselves ahead and against the sides of the cell assembly, whereby they start to support the cell assembly.

The parts 31 and 32 of the outer mold 30 may withdraw a distance equivalent to the wall thickness from the surface of the cell assembly. Thereafter, a gas vault structure 20 is disposed above the final upper surface of the cell assembly, enabling provision of a gas space above the cell assembly. Now, the part 31 of the outer mold 30 pushes itself in place and the terminals 17 and 18 (FIG. 1) tightly intrude into the apertures of appropriate shape therein (not depicted).

Also, the other parts of the outer mold 30 push themselves in place. The outer mold 30 may be so turned that the storage battery 10 being cast is upside down, although this is not necessary. Thereafter, the space between the inner and outer molds can be filled with the material noted in Finnish Patent Application No. 855096, whereby the envelope structure for the storage battery 10 comprising the housing 21, the cover 22, and partitions 23 separating the cells 11 from each other, is produced.

Figure 8:
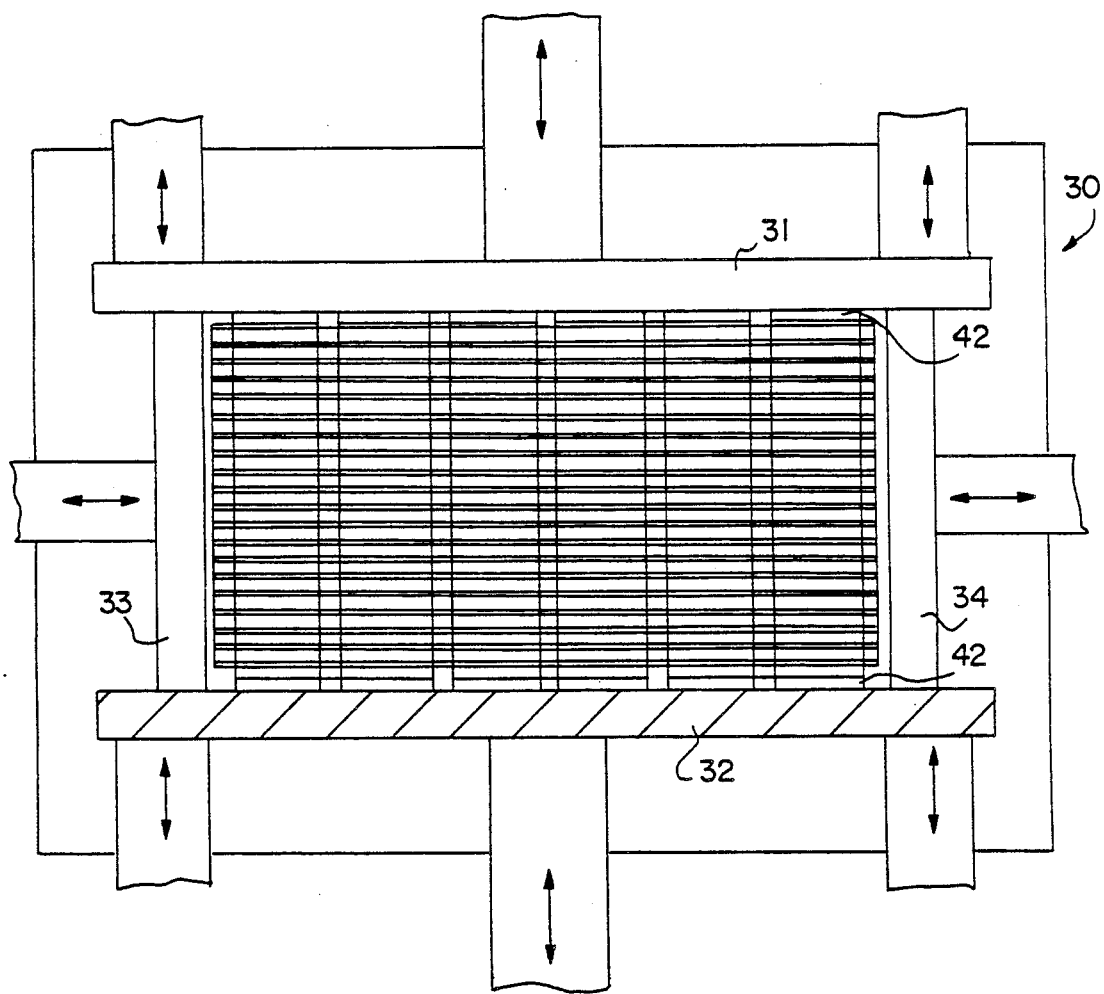
FIG. 8 is a schematic elevational view of another advantageous emboidment of the mold structure utilized in the procedure of the present invention.

As illustrated in another advantageous embodiment of the present invention in FIG. 8, the other side part 32 of the outer mold 30 serves as a stacking base. The stacking is carried out so that spacer strips 42 equivalent to the above-noted spacing washers 39, are first placed on the base, above which the cells are stacked. After a required quantity of cell elements has been stacked, the spacer strips 42' are placed thereon and the side piece 31 of the outer mold 30 to be placed thereon is pressed into place.

The terminals 17 and 18 (FIG. 1) are welded in place, the part 31 of the outer mold 30 pushes itself into place, the end pieces 33 and 34 of the outer mold 30 push themselves into place (or if several storage batteries are cast in rows in the same outer mold 30, then the intermediate end pieces of the outer mold 30 push themselves into place), and thereafter, the collecting of the cover part and the envelope structure is carried out in the manner described in the previous embodiment.

Merely a few advantageous embodiments of the present invention have been described in detail in the foregoing, and it is clear to a person skilled in the art that the procedure of the present invention can be modified in a number of manners within the scope of the inventive concepts presented above. Accordingly, the preceding description of the present invention is merely exemplary, and is not intended to limit the scope thereof in any way.

What is claimed is:

1. Method for producing an envelope structure for a storage battery having at least one cell therein, comprising the steps of arranging said at least one cell as an inner mold for casting of said envelope structure, arranging a separate mold structure as an outer mold for the casting of said envelope structure, casting electrically-insulating and electrolyte-impermeable material between said inner mold and outer mold, and determining wall thickness of housing forming at least part of said envelope structure, with a spacer structure situated to remain inside said casting.

2. The method of claim 1, comprising the additional step of providing a cover upon said battery as part of said envelope.

3. The method of claim 2, wherein the battery comprises a plurality of cells, partitions forming part of said envelope structure being cast between adjacent cells to separate said cells from one another, each said cell containing electrolyte and at least one of a monopolar plate and a bipolar plate coated with at least one of positive and negative active mass, and being separated from any other monopolar or bipolar plates by a separator plate, and electrical connectors interconnecting said cells or the polar plates.

4. The method of claim 1, comprising the additional step of using spacer washers as said spacer structure.

5. The method of claim 4, comprising the additional step of inserting said washers through holes provided in said outer mold structure.

6. The method of claim 1, comprising the additional step of using spacer strips as said spacer structure, and placing said spacer strips between said inner mold and outer separate mold structure before said casting step.

7. The method of claim 3, comprising the addition step of prior to said casting step, disposing a gas vault structure in an upper part of said cells.

8. The method of claim 3, comprising the addition step of prior to said casting step, turning said outer mold structure upside down, so that the battery to be cast with said envelope is upside down.

* * * * *